United States Patent
Von Wendorff (10) Patent No.: US 9,634,604 B2
(45) Date of Patent: Apr. 25, 2017

(54) DEVICE FOR CONTROLLING A MULTI-PHASE MOTOR

(71) Applicant: Wilhard Von Wendorff, Munich (DE)

(72) Inventor: Wilhard Von Wendorff, Munich (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/784,040

(22) PCT Filed: Apr. 30, 2013

(86) PCT No.: PCT/IB2013/053405
§ 371 (c)(1),
(2) Date: Oct. 13, 2015

(87) PCT Pub. No.: WO2014/177907
PCT Pub. Date: Nov. 6, 2014

(65) Prior Publication Data
US 2016/0065114 A1    Mar. 3, 2016

(51) Int. Cl.
*H02P 29/02* (2016.01)
*H02P 29/024* (2016.01)
*B62D 5/04* (2006.01)

(52) U.S. Cl.
CPC .......... *H02P 29/027* (2013.01); *B62D 5/0484* (2013.01); *B62D 5/0487* (2013.01)

(58) Field of Classification Search
CPC .................................................. H02P 29/027
USPC .................. 318/400.22, 400.21, 400.01, 700
See application file for complete search history.

(56) References Cited

U.S. PATENT DOCUMENTS

| | | | |
|---|---|---|---|
| 6,397,971 B1 | 6/2002 | Kifuku | |
| 6,771,033 B2* | 8/2004 | Kokami | H02P 6/182 318/400.35 |
| 7,061,350 B2 | 6/2006 | Schneider et al. | |
| 7,504,790 B2* | 3/2009 | Tsuji | H02P 21/0089 318/432 |
| 8,049,363 B2 | 11/2011 | McLean et al. | |
| 8,051,945 B2 | 11/2011 | Collier-Hallman et al. | |
| 8,421,388 B2* | 4/2013 | Mukai | B62D 5/0463 318/400.01 |

(Continued)

FOREIGN PATENT DOCUMENTS

JP        2008211911        9/2008

OTHER PUBLICATIONS

International Search Report and Written Opinion correlating to PCT/IB2013/053405 issued on Jan. 17, 2014.

(Continued)

*Primary Examiner* — David S Luo (57) ABSTRACT

An electronic device is for controlling motor drive circuits for driving a multi-phase motor in a force assisted system. Each motor drive circuit selectively permitting current to flow into or out of a respective phase of the multi-phase motor connected to the motor drive circuit in response to being driven by respective control signals. A motor control circuit generates the control signals. A fault processor detects at least one fault condition causing a fault current in a first motor drive circuit. In the event of the fault condition being detected, at least one alternative control signal is generated for at least one motor drive circuit for permitting at least one compensation current to flow for reducing a faulty force due to the fault current.

20 Claims, 6 Drawing Sheets

(56) References Cited

U.S. PATENT DOCUMENTS

| 8,502,485 B2 | 8/2013 | Kudanowski et al. |
|---|---|---|
| 2001/0026134 A1 | 10/2001 | Fukumoto et al. |
| 2010/0301713 A1 | 12/2010 | Breuning et al. |
| 2012/0145472 A1 | 6/2012 | Imamura et al. |

OTHER PUBLICATIONS

Jorge Zambada, Field-oriented control for motors, Nov. 8, 2007.
Model-Based Fault Detection and Isolation for Electric Power Steering System, Jeongjun Lee\ Hyeongcheol Lee, Jihwan Kim and Jiyoel Jeong, International Conference on Control, Automation and Systems 2007, Oct. 17-20, 2007 in COEX, Seoul, Korea.
Wikipedia: Vector control (motor) ( http://en.wikipedia.org/wiki/Vector_control_(motor) ).

* cited by examiner

DEVICE FOR CONTROLLING A MULTI-PHASE MOTOR

FIELD OF THE INVENTION

The invention relates to an electronic device for controlling power circuits of an electric motor in an Electric Power Steering (EPS) system.

BACKGROUND OF THE INVENTION

Patent application WO2010/116182 describes a motor drive circuit for an EPS having a positive and a negative supply rail for connection to a battery. The motor drive circuit comprises a plurality of motor drive sub circuits which each selectively permit current to flow into or out of a respective phase of a multi-phase motor in response to control signals from a motor control circuit and a switching means comprising transistor switches which are in series with a respective phase of the motor which are normally closed to permit the flow of current to and from the sub circuit to the respective motor phase. A fault signal detector detects at least one fault condition and in the event of a fault condition being detected causes switches to open. A snubber circuit is associated with the motor and is arranged so that following the opening of the switch energy stored in the motor windings is diverted away from the switching means through the snubber circuit to the battery.

A problem of such motor drive control is that the transistor switches cause unwanted power losses and increase the cost price and the complexity of the motor drive circuitry. Alternatively using a traditional star point relay having switches to disconnect the phases increases cost and failure rate.

However avoiding the switches may cause further problems. United States Patent document U.S. Pat. No. 8,049,363 describes such problems that may occur in an EPS system when faults occur in the motor drive sub circuits, for example when a short circuit occurs across a drive stage transistor. Without means to isolate the motor from the motor drive stages, the phase windings are still connected together and also still connected to the drive stage. As a result of this an electrically conducting path could still be present around the bridge (e.g. through a short circuited transistor and two phase windings). Then, on rotation of the motor shaft drive due to rotation of the steering column, a back EMF is produced in one or more of the windings. Due the back EMF and the complete electrical path around the bridge, a substantial current can flow through the motor phase windings, which produces a torque in the opposite sense to the rotation of the motor shaft. This resisting (counteracting) torque is highly undesirable because in this case, not only is steering assistance lost due to disconnection of the power supply, but a resisting torque is then applied which makes turning the steering column difficult. These problems are, of course, not unique to applications in electric power assisted steering systems.

SUMMARY OF THE INVENTION

The present invention provides an electronic device, and a method, as described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
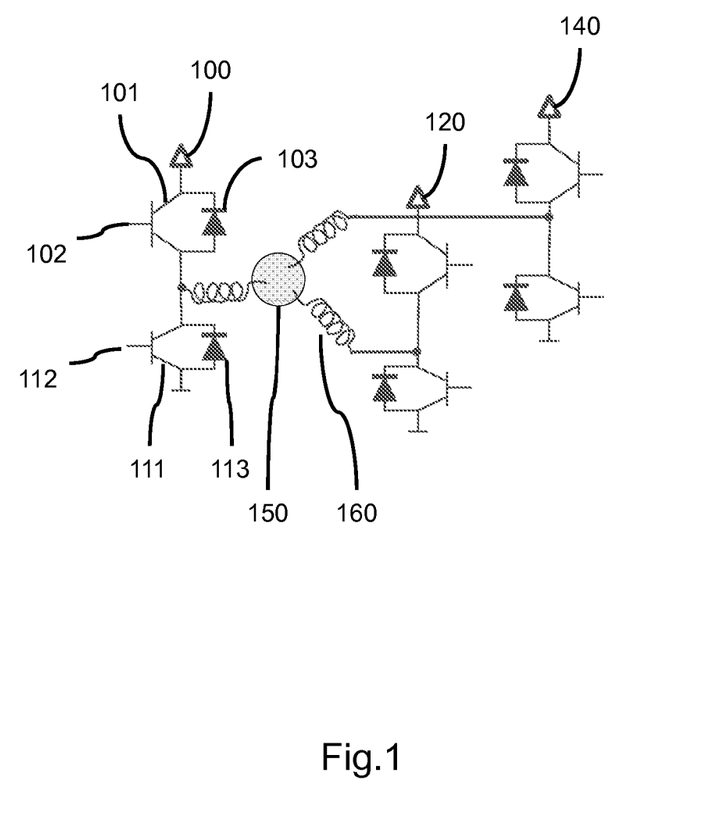
FIG. 1 shows a prior art example of a drive circuit for driving an electric motor for an electrical power steering (EPS) system.

FIG. 1 shows a prior art example of a drive circuit for driving an electric motor for an electrical power steering (EPS) system. The circuit schematically shows a motor 160 having three phases depicted as coils connected at a star point via a star point relay 150. A star point relay has three switches, connecting the three coils together.

Each of the phases has a respective motor driving circuit 100, 120, 140. The first motor driving circuit 100 has a bridge driver of two transistors 101,111, also called a top transistor connected to a positive terminal of a power supply and bottom transistor connected to a negative terminal of the power supply for providing a DC supply voltage, usually from a car battery.

The bridge driver usually has two power transistors respectively coupled to the positive and negative power supply rails forming a bridge, and cooperating diodes to accommodate inductive currents due to switching, usually called freewheeling diodes.

In the Figure, the top transistor 101 has an input 102 for a top control signal and a top diode 103 for transferring excess currents from the connected phase to the power supply, and the bottom transistor 111 has an input 112 for a bottom control signal and a bottom diode 113 for transferring excess currents from the connected phase to the power supply. The other phases of the motor have similarly equipped motor driving circuits 120, 140.

Such a drive circuit may be coupled to a motor control circuit for generating respective control signals according to so-called vector control or field oriented control. As such, such motor control and start point relays are well known. For example, the star point relay may be replaced by three semiconductor switches. Vector control algorithms measure the current flowing through the circuit to define the required voltage to be applied to the coils (PWM duty cycle of bridge drivers). In general, shunt resistors are used. These resistors are connected in series to at least two of the coils. This enables to measure the current through all three coils, as the sum of the currents Icoil0+Icoil1, Icoil2=0. For functional safety reasons to enable detection of faults within the shunt resistors), three shunt resistors are used, one in series with each coil. A shunt resistor has a resistance in the order of several Ohm. Due to the current flowing a voltage drop being proportional to the current may be observed at the resistor terminals. An ADC (analog to digital converter) is used to measure this voltage drop and calculate the current. A description of vector control may, for example, be found on Wikipedia: http://en.wikipedia.org/wiki/Vector_control_(motor).

A further description can be found on http://machinedesign.com/article/field-oriented-control-for-motors-1108 which shows a digital-signal controller that contains all logic and measurement functions on a single chip for field-oriented control of permanent-magnet synchronous motors.

Figure 2:
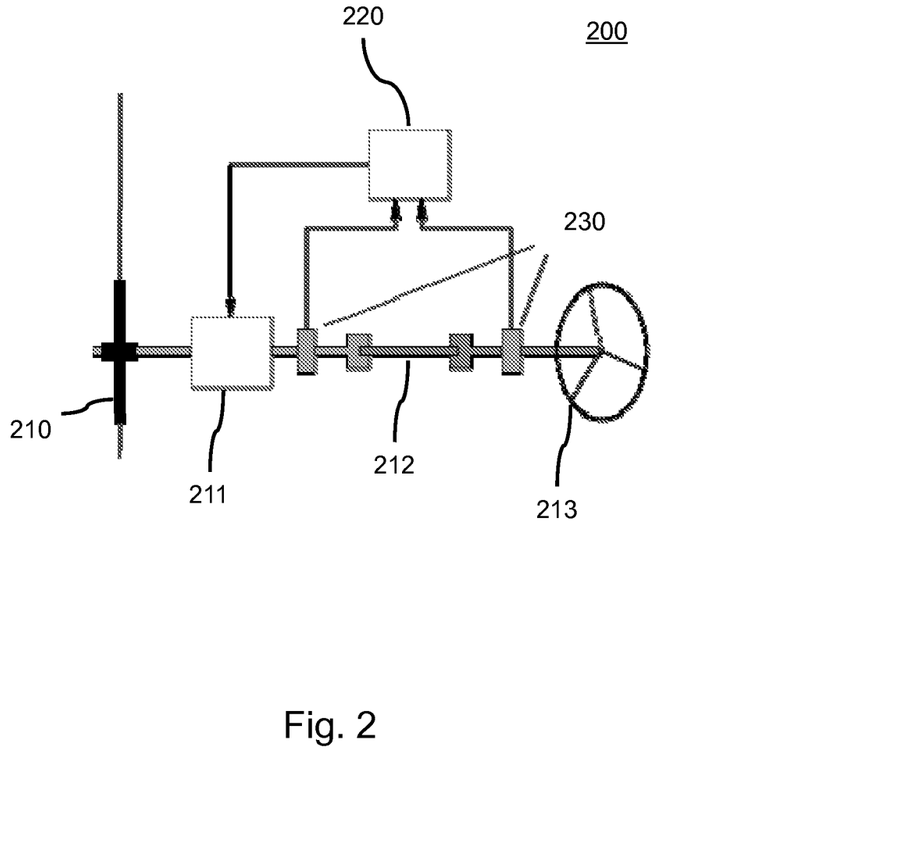
FIG. 2 shows an example of an electrical power steering system.

FIG. 2 shows an example of an electrical power steering system. In the electrical power steering system 200 for a car a steering wheel 213 is connected to a first part of an axle which is coupled via a torsion bar 212 to a second part of the axle, which drives a steering gear 210, which ultimately controls the direction of the wheels of the car. An electric motor 211 is coupled to the second part of the axle. The first and second parts of the axle both are coupled to angular sensors 230, which are connected to a control device 220. The control device is arranged for generating control signals for respective motor drive circuits. An example of the control device is further described below with reference to FIG. 4. The motor drive circuits are connected to respective phases of the electric multi-phase motor, for example as described above and shown in FIG. 1.

Interrupting the power supply for a bridge driver EPS is not a safe state. When a transistor in such a motor drive sub circuit is stuck-closed, self inductance causes a current flowing through the stuck-closed transistor and freewheeling diodes. As a result of this an electrically conducting path could still be present. This conducting path introduces in case of self inductance (fast steering actions) significant counter forces. Then, on rotation of the motor shaft drive due to rotation of the steering column, a back EMF is produced in two or more of the windings. As a result of this EMF and the complete electrical path around the bridge, a substantial current can flow through the motor phase windings, which produces a torque in the opposite sense to the rotation of the motor shaft. Such resisting torque is highly undesirable because in this case, not only is steering assistance probably lost due to disconnection or malfunction of the power supply, but a resisting (counteracting) torque is then generated which makes turning the steering column difficult.

Figure 3:
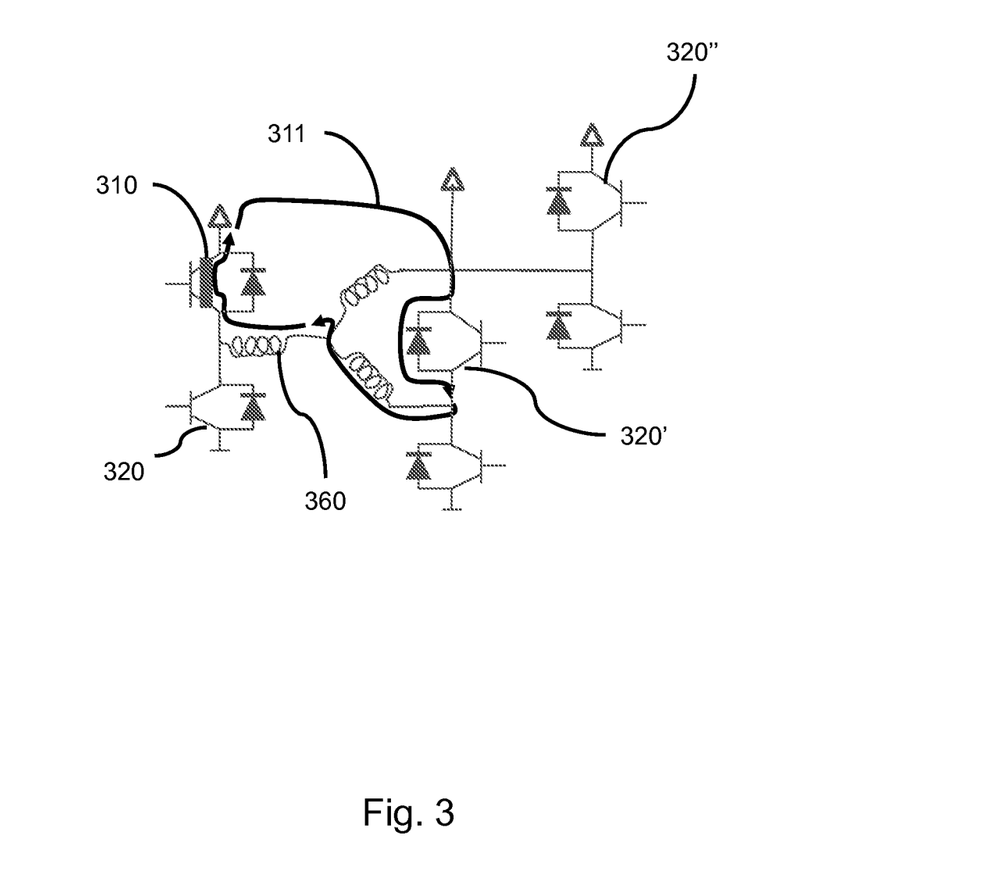
FIG. 3 shows an example of a fault condition in a motor drive circuit.

FIG. 3 shows an example of a fault condition in a motor drive circuit. The circuit is similar to the drive circuit as shown in FIG. 1, wherein the star point relay 150 has been removed and the respective phases of the motor are all interconnected constituting the star point as shown in FIG. 3. In the Figure a top transistor of the first motor drive circuit 320 has, as shown by a bar 310, a short-circuit, also called a stuck-close. Such a stuck-close may be caused by a transistor failure, an erroneous input signal to such transistor, an external cause like conductive dirt between terminals of the transistor, etc. The stuck-close condition enable a fault current 311 to flow via the connected phase coil, via the star point, via a further phase coil, and via a protective diode of another bridge driver. It is noted that the actual direction and path of the fault current may vary due to the respective back-EMF that is generated by rotation of the motor as explained above.

Figure 4:
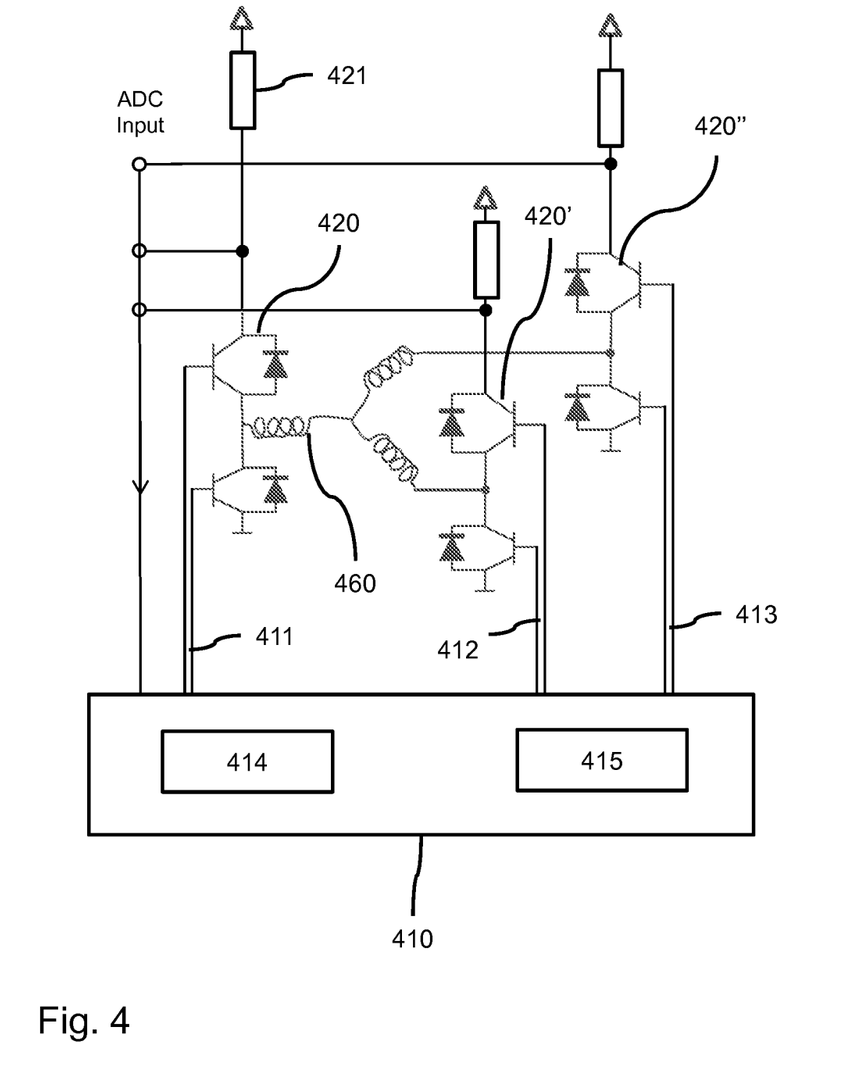
FIG. 4 shows an example of an electronic device for controlling motor drive circuits for driving a multi-phase motor in a force assisted system.

FIG. 4 shows an example of an electronic device for controlling motor drive circuits for driving a multi-phase motor in a force assisted system. The motor drive circuits 420, 420', 420" are coupled to a supply voltage. Each motor drive circuit selectively permits current to flow into or out of a respective phase of a multi-phase motor 460 connected to the motor drive circuit in response to being driven by respective control signals 411,412,413 from the electronic device 410. Each of the motor drive circuits has a resistor 421 so as to enable detecting the current flowing via the motor drive circuit, e.g. by detecting the voltage across the resistor via an analog to digital converter (ADC).

The electronic device 410 has a motor control circuit 415 for generating the control signals according to a vector control algorithm. The electronic device has a fault processor 414 for detecting at least one fault condition causing a fault current in a first motor drive circuit. In the event of the fault condition being detected, the fault processor generates at least one alternative control signal for at least one motor drive circuit for permitting at least one compensation current to flow for reducing a faulty force due to the fault current. The fault processor may be coupled to an ADC to detect currents that are flowing via the respective bridges via respective resistors, e.g. resistor 421 as shown in FIG. 4, so as to detect the fault condition. Detailed embodiments of the fault processor 414 are described now.

It is noted that, traditionally, the star point relay or another triple contact bridge is integrated in EPS motor to disconnect/connect all three coils of the motor at the star point. However, such a relay has a high failure rate, which reduces the availability of the system and reduces the safety. Instead, the current device obviates the need for such a relay and uses an operational bridge driver to actively drive a current compensating the erroneous self inductance (back EMF) current and reduce the erroneous steering counter forces In case of a stuck-closed fault, different measures may be applied. In a first example the respective complementary transistor of the half bridge (high side/low side), i.e. complementary to the stuck-close transistor, is partly closed. The current is limited to a predetermined value, e.g. by a pulse width modulated (PWM) gate signal. The compensation current so generated will cause a voltage drop across the stuck-closed transistor. The voltage drop will reduce the self inductance (back EMF) current. In the case of using the second half of the half bridge to implement a compensating short circuit, this second transistor has to permit a short circuit current:

$$I_{short} = U_{driver\ controllable\ force}/R_{stuck-closed}$$

A further example of generating a compensating current is to close half bridge of another coil. Current in the other coil is set to cause a force having the opposite direction of the force caused by said back EMK due to self inductance. In a further example, the strength of the faulty force is measured or estimated, and the compensation current is set to compensate the faulty force.

The fault processor may be arranged to detect the stuck-close resistance. The self inductance (back EMF) current can be calculated using the motor rotation speed which is related to the steering wheel angular velocity, and taking resistance of freewheeling diode, motor coils, and stuck-closed transistor into account.

It is noted that this method of generating a compensating current provides a safe limp-home modus. The method could be entirely implemented in software, entirely in hardware or software supported by hardware. A full compensation may not be possible, as the approach may only partly compensate the forces in case of low source-drain-resistance ($R_{DSON}$) of the stuck-closed transistor and the limited Ishort the second transistor may be able to drive (maximum operation condition). The second principle has the potential to compensate the inductive currents for a relatively high $R_{DSON}$ of the stuck-closed transistor, however may only partly compensate the forces in case of certain angles due to the fixed phase differences of the different coils. In practice about 50% reduction is possible when averaged over a full phase.

Figure 5:
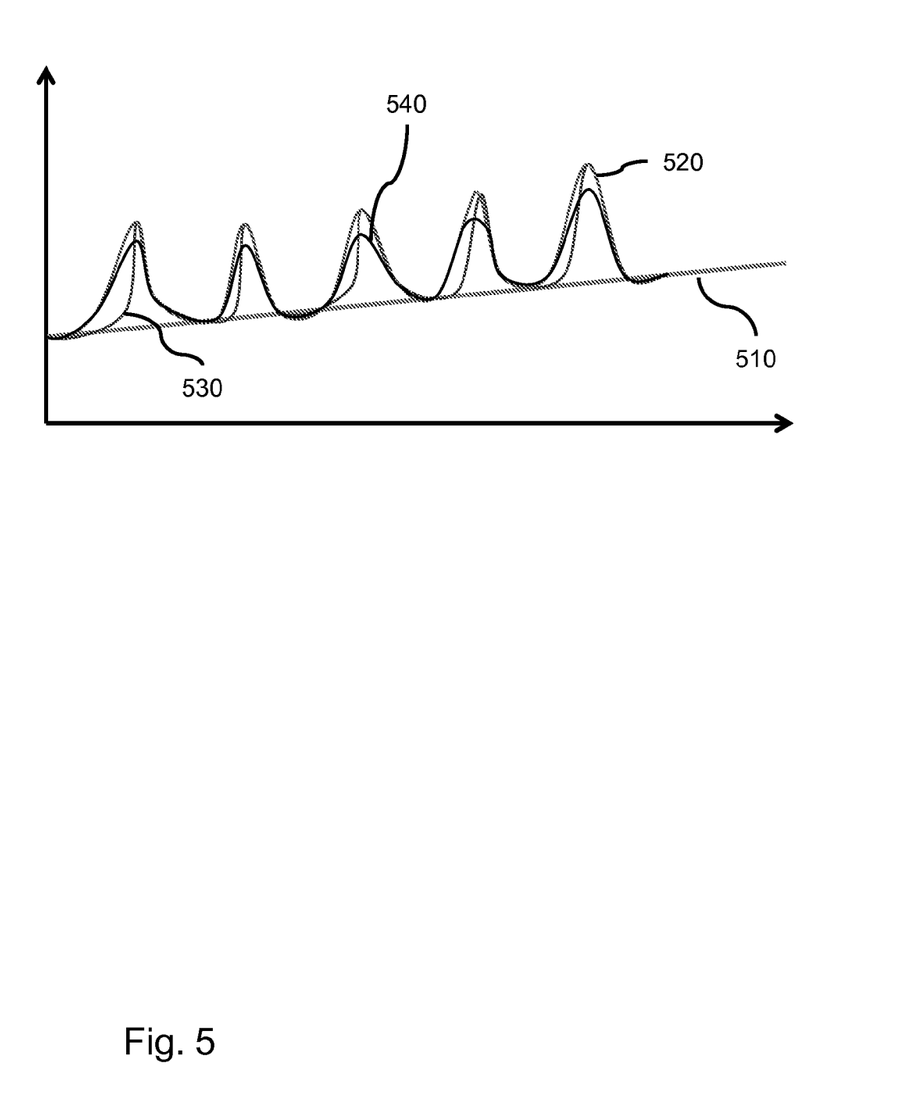
FIG. 5 shows an example of reducing of a faulty force.

FIG. 5 shows an example of reducing of a faulty force. In a graph, on the vertical axis, the steering wheel force is depicted, and on the horizontal axis the steering wheel angle per time. A straight line 510 provides the relation for normal operation of an electronic power steering system, which indicates a slowly increasing force when the angle per time increases.

A first bumpy curve 520 provides the relation for faulty operation of an electronic power steering system when a transistor is due to a fault stuck-closed, i.e. without any compensation. It can be seen that sharp and periodic increases in the force occur when the angle per time increases, which are called faulty forces.

A second curve 530 provides the improved relation for faulty operation of an electronic power steering system when a transistor is stuck-closed and a compensation current is applied via a different coil. It can be seen that the sharp and periodic increases of curve 520 are now reduced in time when the angle per time increases, so the total faulty force is less. It is noted that compensating with the "healthy" coils is only possible for a certain angle range. The second curve therefore shows a shift of the rising edge of the (blue line) if using this technique.

A third curve 540 provides the improved relation for faulty operation of an electronic power steering system when is transistor is stuck-closed and a compensation current is generated via a control signal enabling a substantial short circuit of the complementary transistor in the bridge driver. It can be seen that peaks in said sharp and periodic increases of curve 520 are now reduced in force when the angle per time increases. It is noted that compensating by a controlled short circuit using the second half of the half bridge transistors will lower the maximum of the fault current, as to be seen in the third curve.

From the third curve 540 in the Figure it appears that driving a complementary transistor to effectively also short circuit will clip the maxima of the counter force. Actively driving an opposite pair of coils, as shown by the second curve 530, narrows the counter force maxima. Both measures may be implemented simultaneously and will reduce the faulty induced forces to about 0 to 50% of the original value depending on the actual $R_{DSON}$ of the stuck-closed transistor. However these measures not only reduce the safety critical influence of erroneously stuck-closed transistor, but also reduce the safety critical impact of short circuits between windings of the multiple phase motor.

Figure 6:
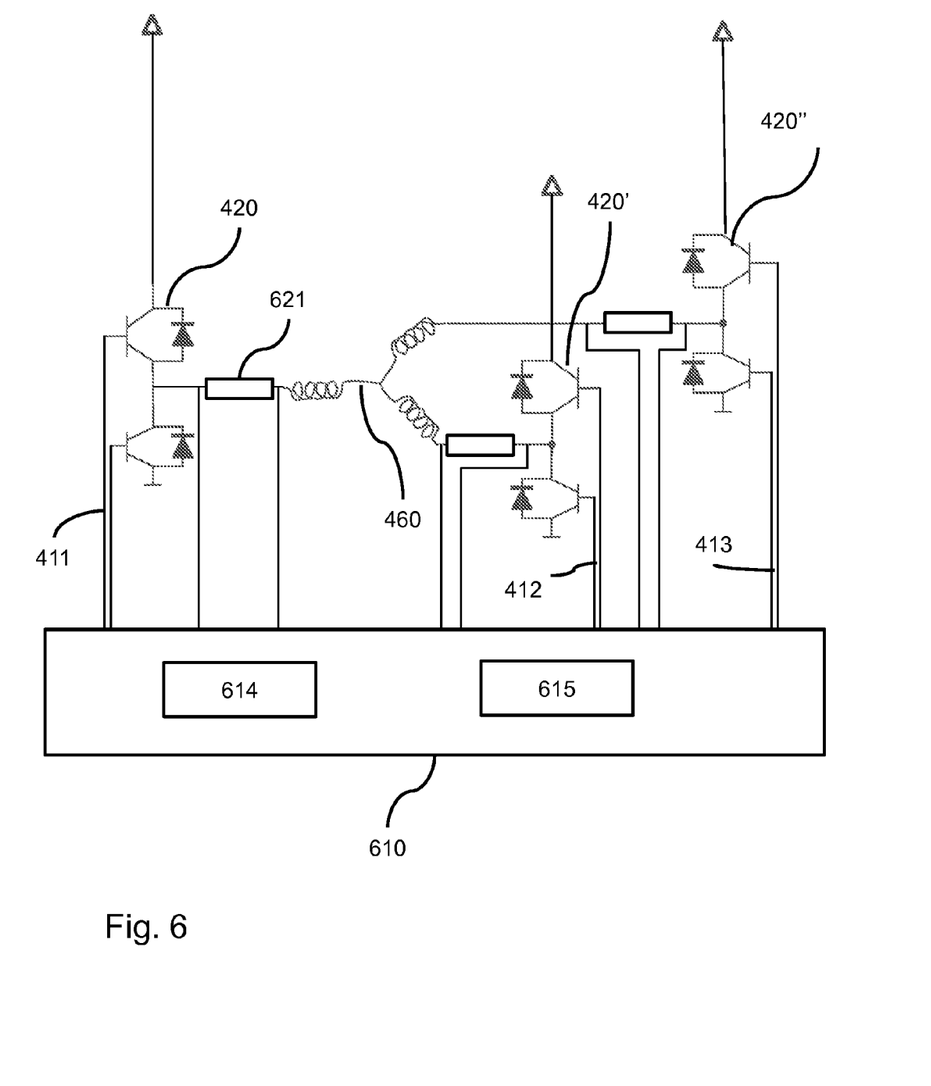
FIG. 6 shows an example of an electronic device for controlling motor drive circuits for driving a multi-phase motor in a force assisted system.

FIG. 6 shows an example of an electronic device for controlling motor drive circuits for driving a multi-phase motor in a force assisted system. The electronic circuit 610 is similar to the device 410 in FIG. 4, and arranged for controlling the motor drive circuits 420, 420', 420" that are coupled to a supply voltage. Each motor drive circuit selectively permits current to flow into or out of a respective phase of a multi-phase motor 460 connected to the motor drive circuit in response to being driven by respective control signals 411,412,413 from the electronic device 610. At least two of the motor drive circuits have a measurement resistor 621 is connected series with the respective phase of the motor, so as to enable detecting the current flowing to the motor, e.g. by detecting the voltage across the resistor via a analog to digital converter (ADC). It is noted that the third current of a three phase motor may be calculated from the difference of the other two currents, due to all currents adding to zero on the star point.

The electronic device 610 has a motor control circuit 615 for generating the control signals according to a vector control algorithm. The electronic device has a fault processor 614 for detecting at least one fault condition causing a fault current in a first motor drive circuit. In the event of the fault condition being detected based on detecting a voltage across at least one measurement resistor, the fault processor generates at least one alternative control signal for at least one motor drive circuit for permitting at least one compensation current to flow for reducing a faulty force due to the fault current. The fault processor may be coupled to an ADC to detect currents that are flowing via the respective bridges via respective resistors, e.g. resistor 421 as shown in FIG. 4, so as to detect the fault condition.

Further embodiments of the fault processor are described now. The fault processor may be arranged for detecting the at least one fault condition based on detecting a stuck-close condition of a power transistor in a motor drive circuit. The stuck-close condition may be detected based on detecting one or more currents in the motor drive circuits. Such current may be compared to a predetermined threshold, or may be compared to a dynamic predicted pattern. Such a detection is, for example, described in the document "Model-Based Fault Detection and Isolation for Electric Power Steering System, Jeongjun Lee\Hyeongcheol Lee, Jihwan Kim and Jiyoel Jeong, International Conference on Control, Automation and Systems 2007, Oct. 17-20, 2007 in COEX, Seoul, Korea" (available in IEEEXPLORE).

Optionally, the fault processor is arranged for detecting the stuck-close condition by detecting, during rotation of the motor, the fault current in a motor drive circuit that is being driven by the respective control signal, the fault current exceeding a predicted current by a predetermined amount. For example, the predicted current may be a maximum current set during manufacture of the EPS.

Optionally, the fault processor is arranged for detecting the stuck-close condition by detecting, during rotation of the motor, the fault current in a motor drive circuit that is not being driven by the respective control signal. The fault current can be detected easily in a drive circuit that is not driven, because normally no current should be flowing if the control signals are disabling the respective transistors in the motor drive circuit.

Optionally, the fault processor is arranged for detecting the fault current in a first motor drive circuit generated due to the fault condition, and for generating a compensating control signal for at least one other motor drive circuit for permitting at least one compensation current via said at least one other motor drive circuit. As the other circuits will usually be still operational, the control signals of the other, operational motor drive units may be controlled to generate a counter force by said compensating current, or, equivalently, reducing the faulty force by reducing the effective current driving the motor. Optionally, the fault processor is arranged for generating the compensating control signal for at least one other motor drive circuit so that the compensation current causes a force having a direction opposite to the faulty force. This may be a predetermined mode in which a predefined compensation current is generated irrespective of the actual faulty current, but having the opposite effect. It may be dimensioned to count a common failure mode of a stuck-close transistor. In a more detailed compensation scheme, the fault processor may be arranged for generating the compensating control signal for at least one other motor drive circuit so that the compensation current causes a force having a strength compensating the faulty force. Thereto the strength is estimated or detected from a force sensor.

Usually the motor drive circuits each have a bridge driver, e.g. as shown in FIG. 4. Optionally, the fault processor is arranged for detecting, in a first motor drive circuit, the fault current generated due to the fault condition in one transistor of the bridge driver, and for generating a compensating control signal for the first motor drive circuit for permitting at least one compensation current via the complementary transistor of the bridge driver. Furthermore, the fault processor may be arranged for generating a pulse width modulated gate signal as the compensating control signal so as to partly the close the complementary transistor.

The above options may be combined. For example, the fault processor may be arranged for generating the compensating control signal for the first motor drive circuit which has the stuck-close transistor and also generate the compensating control signal for at least one other motor drive circuit so that the combined compensation currents have the effect of compensating the faulty force.

Optionally, at least one of the motor drive circuits has a series resistor enabling current measurements. The fault processor may be arranged for detecting the fault current in the at least one motor drive circuit by determining a fault voltage across the series resistor. The series resistor may be coupled between the positive power supply and a bridge drives as shown in FIG. 4, or in the bridge between the top and bottom transistor, or between the bottom transistor and the negative power supply or ground. Inserting the shunts in the ground connections of the three half bridges enables a microcontroller coupled ADC to detect the current measurement voltages, as the supply voltage of the motor is above 5V being the maximum voltage of the microcontroller ADC. A location between the top transistor and the positive supply might require extra elements such as a resistor divider.

So the series resistor may be coupled between the supply voltage and a transistor of a bridge driver in the at least one motor drive circuit. Alternatively, or additionally, a series resistor may be present in series with the respective phase of the motor, e.g. like resistor 621 as shown in FIG. 6.

Optionally, the electronic circuit may also comprise said motor drive circuits. For example a single module may be assembled both the motor control circuit and the fault processor, and also the motor drive circuits, and any other electronic components, processor and or software to drive the motor and control faulty behavior. Optionally, an integrated circuit may comprise the device, or multiple electronic devices, according to any one of the above options.

Optionally, the above motor control may be performed as follows. A method of controlling motor drive circuits is provided for driving a multi-phase motor in a force assisted system. The motor drive circuits are coupled to a supply voltage, and each motor drive circuit selectively permits current to flow into or out of a respective phase of the multi-phase motor connected to the motor drive circuit in response to being driven by respective control signals. The method has the following steps. Operationally, the control signals are generated, e.g. according to the vector control as mentioned above. At least one fault condition is detected which causes a fault current in a first motor drive circuit. In the event of the fault condition being detected, at least one alternative control signal is generated for at least one motor drive circuit for permitting at least one compensation current to flow for reducing a faulty force due to the fault current.

Optionally, the at least one fault condition is detected based on detecting a stuck-close condition of a power transistor in a motor drive circuit. For example, the stuck-close condition is detected, during rotation of the motor, by a fault current in a motor drive circuit that is not being driven by the respective control signal. Optionally, the stuck-close condition is detected by, during rotation of the motor, a fault current in a motor drive circuit that is being driven by the respective control signal, the fault current exceeding a predicted current by a predetermined amount.

Optionally, the method includes detecting the fault current in a first motor drive circuit generated due to the fault condition, and generating a compensating control signal for at least one other motor drive circuit for permitting at least one compensation current via said at least one other motor drive circuit. Optionally, the method includes detecting, in a first motor drive circuit having a bridge driver, the fault current generated due to the fault condition in one transistor of the bridge driver, and generating a compensating control signal for the first motor drive circuit for permitting at least one compensation current via the complementary transistor of the bridge driver.

Stuck-close conditions may be detected because during a revolution always one coil is unpowered. Therefore, by monitoring a current in an unpowered coil a stuck-closed is detected. Additionally the supply voltage may be monitored. If supply voltage of the drives is absent and a stuck-close happen at the same point of time, still back EMF current can be measured using the shunt resistors.

It is noted that, in the event of a fault, the traditional way to switch of the supply voltage of the motor is to switch of all bridge driver transistors. In the case both bridge driver transistors fail, the system will be in a non safe state. However, as the failures of transistors are assumed independent, the probability both failing is the product of the probability, that a single transistor fails and therefore neglectable. However, if there is a systematic fault, e.g. current is so high, that avalanche break through happens, then likely both transistors will fail. However, this is a systematic issue to be avoided by selecting transistors able to handle the currents to be expected. Even if a two transistor fail (a high side and a low side, but not the same pair, as this is safe already due to the high currents flowing through no coil), the proposed circuit will still reduce the erroneous forces.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed. Also, although the invention has been elucidated for three phase motors, it is valid for all counts of phases of multiple phase motors. A 3-phase motor is the smallest phase count and higher phases due to the smaller phase differences of the phases even improve the compensation possible, especially for the second approach (closing the half bridge of another coil).

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An electronic device to control a plurality of motor drive circuits to drive a multi-phase motor in a force assisted system, the electronic device comprising:
    a motor control circuit to generate control signals and to provide the generated control signals to the motor drive circuits, wherein the motor drive circuits being coupled to a supply voltage, each motor drive circuit selectively permitting current to flow into or out of a respective phase of the multi-phase motor connected to the motor drive circuit in response to being driven by respective control signals; and
    a fault processor to detect a fault condition causing a fault current in a first motor drive circuit and, in the event of the fault condition being detected, to generate an alternative control signal for at least one motor drive circuit of the plurality of motor drive circuits to permit a compensation current to flow, the compensation current to cause a force having a direction opposite to a faulty force due to the fault current.

2. The device as claimed in claim 1, wherein the fault processor is arranged for detecting the at least one fault condition based on detecting a stuck-close condition of a power transistor in a motor drive circuit.

3. The device as claimed in claim 2, wherein the fault processor is arranged for detecting the stuck-close condition by detecting, during rotation of the motor, the fault current in a motor drive circuit that is not being driven by the respective control signal.

4. The device as claimed in claim 2, wherein the fault processor is arranged for detecting the stuck-close condition by detecting, during rotation of the motor, the fault current in a motor drive circuit that is being driven by the respective control signal, the fault current exceeding a predicted current by a predetermined amount.

5. The device as claimed in claim 1, wherein the fault processor is arranged for detecting the fault current in a first motor drive circuit generated due to the fault condition, and for generating a compensating control signal for at least one other motor drive circuit for permitting at least one compensation current via said at least one other motor drive circuit.

6. The device as claimed in claim 1, wherein the fault processor is arranged for generating the compensating control signal for at least one other motor drive circuit so that the compensation current causes a force having a strength compensating the faulty force.

7. The device as claimed in claim 6, wherein the fault processor is arranged for generating the compensating control signal for the first motor drive circuit and the compensating control signal for at least one other motor drive circuit so that the combined compensation currents have the effect of compensating the faulty force.

8. The device as claimed in claim 1, wherein the fault processor is arranged for detecting, in a first motor drive circuit having a bridge driver, the fault current generated due to the fault condition in one transistor of the bridge driver, and for generating a compensating control signal for the first motor drive circuit for permitting at least one compensation current via the complementary transistor of the bridge drive.

9. The device as claimed in claim 8, wherein the fault processor is arranged to partly the close the complementary transistor in response to a pulse width modulated gate signal as the compensating control signal.

10. The device as claimed in claim 1, wherein at least one motor drive circuit has a series resistor and the fault processor is arranged for detecting the fault current in the at least one motor drive circuit by determining a fault voltage across the series resistor.

11. The device of claim 10, wherein the series resistor is coupled between the supply voltage and a transistor of a bridge driver in the at least one motor drive circuit.

12. The device as claimed in claim 1, wherein the device comprises said motor drive circuits.

13. An integrated circuit comprising at least one electronic device according to claim 1.

14. The electronic device of claim 1, wherein the faulty force is a back electromotive force within a winding of the multi-phase motor.

15. A method of controlling motor drive circuits for driving a multi-phase motor in a force assisted system, the motor drive circuits being coupled to a supply voltage, each motor drive circuit selectively permitting current to flow into or out of a respective phase of the multi-phase motor connected to the motor drive circuit in response to being driven by respective control signals, the method comprising:
    generating the control signals;
    detecting at least one fault condition causing a fault current in a first motor drive circuit; and
    in response to the fault condition being detected, generating an alternative control signal for at least one motor drive circuit of the plurality of motor drive circuits for permitting a compensation current to flow, the compensation current to cause a force having a direction opposite to a faulty force due to the fault current.

16. The method as claimed in claim 15, comprising detecting the at least one fault condition based on detecting a stuck-close condition of a power transistor in a motor drive circuit.

17. The method as claimed in claim 16, comprising detecting the stuck-close condition by detecting, during rotation of the motor, the fault current in a motor drive circuit that is not being driven by the respective control signal.

18. The method as claimed in claim 16, comprising detecting the stuck-close condition by detecting, during rotation of the motor, the fault current in a motor drive circuit that is being driven by the respective control signal, the fault current exceeding a predicted current by a predetermined amount.

19. The method as claimed in claim 15, comprising detecting the fault current in a first motor drive circuit generated due to the fault condition, and generating a compensating control signal for at least one other motor drive circuit for permitting at least one compensation current via said at least one other motor drive circuit.

20. The method as claimed in claim 15, comprising detecting, in a first motor drive circuit having a bridge driver, the fault current generated due to the fault condition in one transistor of the bridge driver, and generating a compensating control signal for the first motor drive circuit for permitting at least one compensation current via the complementary transistor of the bridge driver.

* * * * *